H. H. GREGORY.
TRAILER FOR ROAD VEHICLES.
APPLICATION FILED MAY 27, 1913.
1,237,507.
Patented Aug. 21, 1917.
3 SHEETS—SHEET 3.
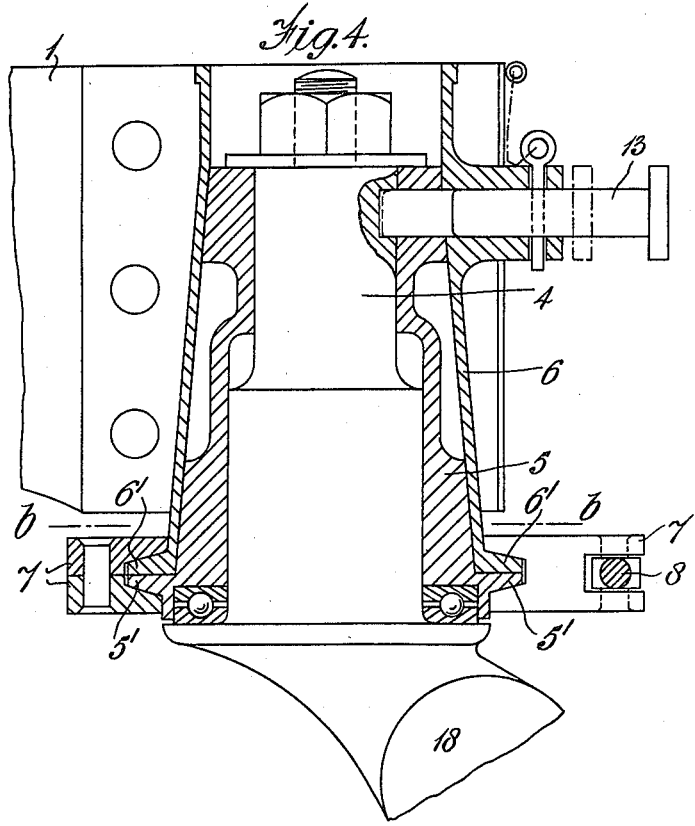
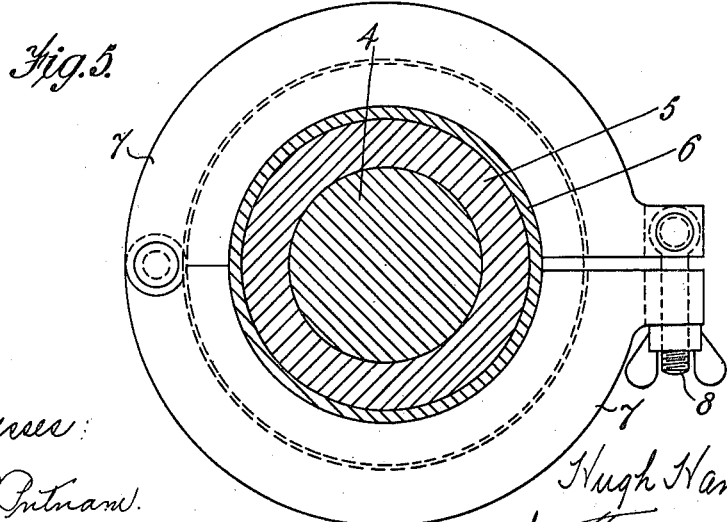

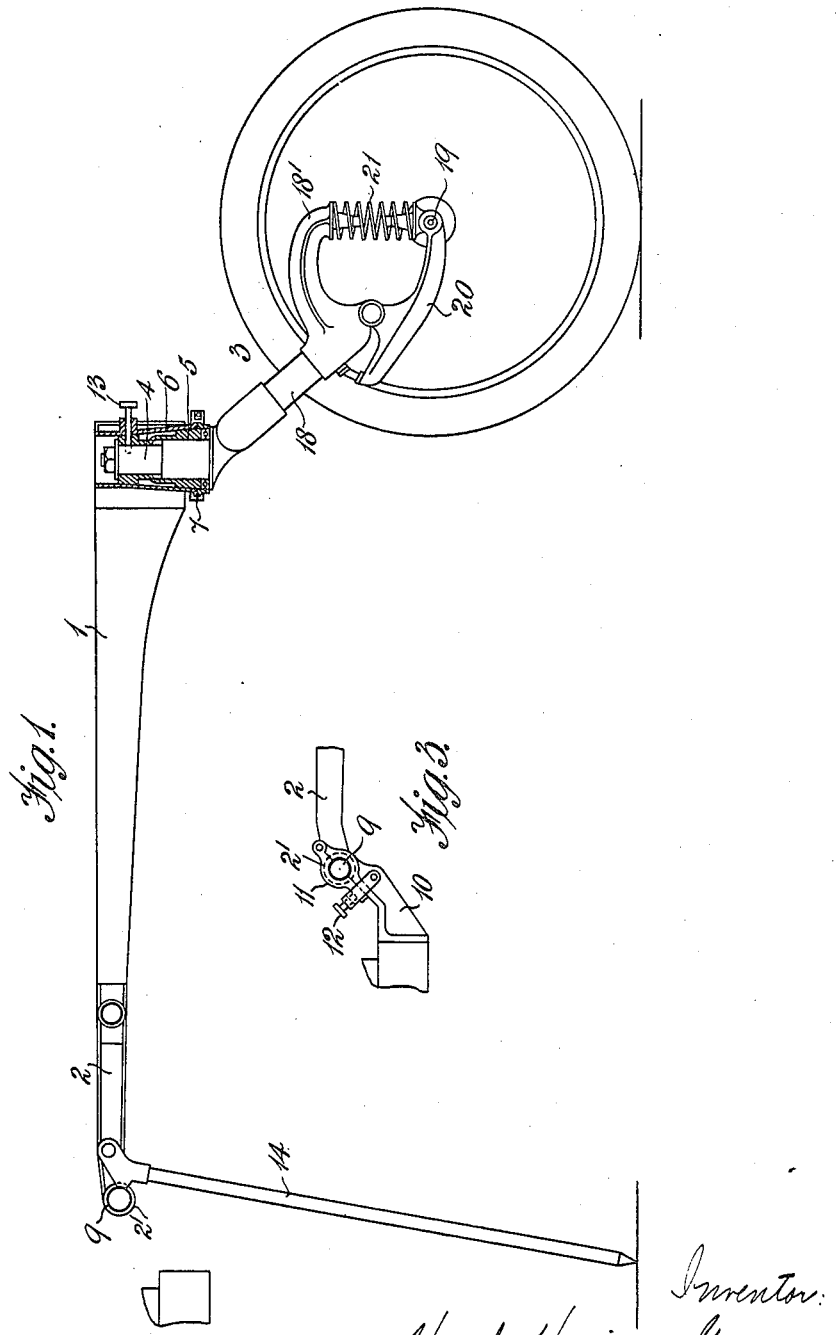

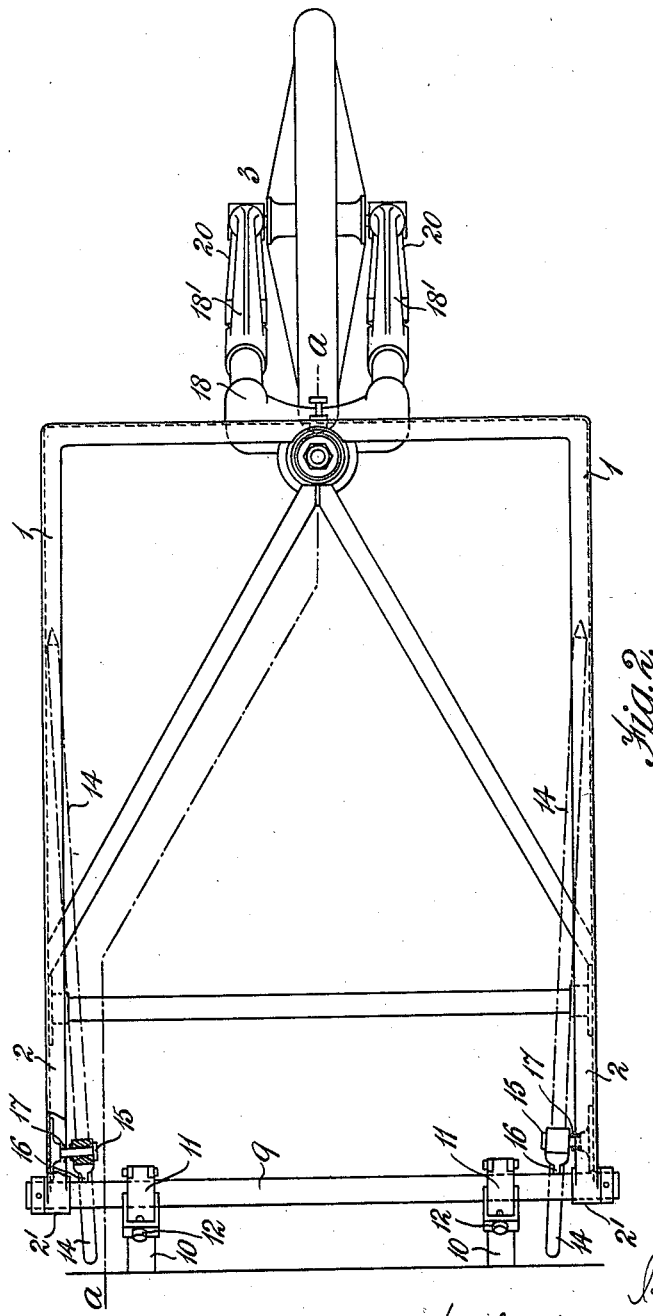

UNITED STATES PATENT OFFICE.

HUGH HAMILTON GREGORY, OF BARNES, ENGLAND.

TRAILER FOR ROAD-VEHICLES.

1,237,507.  Specification of Letters Patent.  Patented Aug. 21, 1917.

Application filed May 27, 1913. Serial No. 770,199.

*To all whom it may concern:*

Be it known that I, HUGH HAMILTON GREGORY, a subject of the King of Great Britain and Ireland, residing at Muizenberg, Gerard Road, Barnes, in the county of Surrey, England, have invented new and useful Improvements Relating to Trailers for Road-Vehicles, of which the following is a specification.

This invention relates to trailers intended to be connected to motor cars and other road vehicles.

The objects of the invention are to produce a trailer which will promptly respond to and accurately follow the movements of the propelling motor car or other road vehicle both in a forward and also in a rearward direction and to produce a trailer which can not be upset.

According to the present invention a trailer is for the above named purposes supported on one or more caster wheels and is hingedly connected at its front corners to the motor car or other propelling road vehicle. This connection, which allows the motor car or other road vehicle and the trailer to move independently of one another in a vertical direction, may be effected by means of two horns or projecting arms located at the front end of the trailer and formed with eyes, and a rod or tube, of diameter corresponding to said eyes, which is supported in brackets or arms fixed to the rear of the motor car or other road vehicle and is fixedly secured in said brackets or arms by means of hinged caps and tumbler bolts or other suitable means.

The trailer is preferably provided with means by which the pivot or pin of the caster wheel, or of each caster wheel if more than one caster wheel is used, may be locked against rotation, thus enabling the trailer to be wheeled like a barrow, and with legs by which the trailer can be left standing when detached from the motor car or other road vehicle. The trailer is also preferably constructed in such manner that the caster wheel or caster wheels can, when the trailer is out of use, be readily detached from the frame or main part of the trailer thus economizing storage space.

The invention is illustrated by the accompanying drawings.

Figure 1 is a vertical section of a trailer constructed according to the invention, the section being taken on the line *a—a* of Fig. 2. Fig. 2 is a plan of said trailer. Fig. 3 is a view illustrating more clearly the arrangement and construction of parts by which connection of the trailer to a motor car or other road vehicle is preferably effected. Fig. 4 is a vertical section illustrating one construction by means of which a caster wheel may be detachably mounted in the frame of the trailer. Fig. 5 is a part plan and part section of the same construction, the section being taken on the line *b—b* of Fig. 4.

Referring now to these drawings, 1 is the frame or main part of the trailer to which a wood or other platform, not shown, would be secured. This frame 1 may be constructed of girder work, as shown on the drawings, or of tubes. The trailer is provided at its front corners with two horns or arms 2, formed with eyes 2', and also with one or more caster wheels 3. In the majority of cases only one caster wheel arranged in the center line of the trailer would be used, but in other cases two or, if desired, more caster wheels would be used, for instance two caster wheels arranged at the rear corners of the trailer, or alternatively three caster wheels, one disposed in the center line of the trailer intermediate between its ends and the other two at the rear corners of the trailer. When two or more caster wheels are used and the distance between vertical lines passing through the centers of the wheels is such that the wheels could foul one another, the wheels are connected so as to work in unison by means of chain gearing or a connecting rod and crank disks. The caster wheel 3 or each caster wheel if more than one caster wheel is used may be permanently mounted in the frame 1 of the trailer, but said caster wheel or each caster wheel may be detachably mounted in the frame 1 in such manner as to be readily removed therefrom when the trailer is not in use, thus reducing to a very material extent the space then occupied by the trailer. For this purpose the pivot or pin 4 of the caster wheel or each caster wheel may be rotatably mounted in an outer casing 5 and the frame 1 of the trailer be formed with a correspondingly shaped socket or sockets 6 for the reception of the casing or casings 5, the caster wheel or wheels 3 being secured in the frame 1 with the surfaces of said casing or casings 5 and socket or sockets 6 in close contact by means of a ring or rings 7 formed of two parts hinged together, which embrace flanges 5' and 6' on the casing or casings 5 and the socket or sockets 6, and are contracted on to said flanges by means of a tumbler bolt 8 or the like.

The trailer, whether it is provided with a caster wheel or caster wheels permanently mounted in its frame or detachably mounted therein, is hingedly connected at its front corners to the rear of the motor car or other road vehicle so as to enable either to move independently of the other in a vertical direction. For this purpose I prefer to use a rod or tube 9 of the same diameter as that of the eyes 2' of the horns 2 and to provide the rear of the motor car or other road vehicle with a pair of brackets 10 having hinged caps 11 adapted to be secured in position by means of tumbler bolts 12. When this arrangement of parts is adopted the connection of the trailer to a motor car or other road vehicle could be rapidly effected, as all that would be necessary would be to place the rod or tube 9 in the brackets 10 and fixedly secure it in position therein by means of the hinged caps 11 and the tumbler bolts 12.

A trailer constructed according to the present invention is provided with means by which the pivot or pivots 4 of the caster wheel or caster wheels 3 may be locked against rotation so that the trailer can, when it is detached from a motor car or other road vehicle, be wheeled like a barrow and can when it is provided at its rear with a single caster wheel or two caster wheels and at its front with a pair of hinged legs or the like, as hereinafter described, remain in a standing position. Said locking means may, when the above described arrangement of casing 5 and socket 6 is employed, consist of a pin 13 passing through holes formed in said casing and socket, engaging with a hole in the pivot or pin 4 of the caster wheel, and retained in its outer position by any suitable device.

In order that the trailer may, when provided with either a single caster wheel or two caster wheels located at its rear end, remain in a standing position when detached from a motor car or other road vehicle it is, in addition to the above referred to locking means, provided at its front with legs or a frame hinged to the frame or main part 1 of the trailer and adapted when out of use to be supported below or housed within the frame of the trailer. When a pair of legs is used these legs 14 would be mounted on studs 15 secured to the side members of the frame 1 of the trailer, and be provided with projections 16 adapted to engage with the rod or tube 9 or with projections adapted to bear against the lower surfaces of the side members of the frame 1. If said side members are of channel section the legs 14 could be retained in a raised position with their ends housed in the frame 1 by the action of coiled springs 17 mounted on said studs between the side members of the frame 1 of the trailer and the eyes of the legs 14, which eyes would be such as to permit of the necessary movement of the legs.

The caster wheel or caster wheels may be provided with springs or other anti-vibratory or shock-absorbing devices. When coiled springs are employed the depending arms of the fork or forks 18 of the caster wheel or caster wheels may be provided with rearward extensions 18' and the axle or axles 19 of the caster wheel or caster wheels be supported in the outer ends of levers or arms 20 pivoted intermediate between their ends to the depending arms of the fork or forks 18, the coiled springs 21 being interposed between the extensions 18' and the levers or arms 20. The opposed parts of the extensions 18' of the forks 18 and the levers or arms 20 as well as the further ends of the latter may be provided with stops to limit the motion. The stops may be provided with rubber blocks for absorbing such shocks as would otherwise occur if the parts were to come into contact, when the parts had reached their limit of movement.

Having now described my invention what I have invented and desire to secure by Letters Patent in the United States is as follows:—

1. In a trailer for road vehicles the combination comprising a frame, a single supporting caster secured to said frame, and means for attaching the frame to a vehicle to permit of movement of the frame vertically about said means and to restrict it against oscillation about its longitudinal axis.

2. In a trailer for road vehicles the combination comprising a frame, a single supporting caster secured to said frame, and means for attaching the frame to a vehicle to permit of movement of the frame vertically about said means and to restrict it against oscillation about its longitudinal axis, and against lateral movement with respect to the vehicle.

3. In a trailer for road vehicles, the combination comprising a frame, a single supporting caster therefor, a cross-rod at the forward part of said frame, hinged clamps secured to a vehicle and spaced apart horizontally and arranged to form a detachable connection between said vehicle and cross-rod.

4. In a trailer for road vehicles, a shock absorbing caster comprising a fork having arms extending from each prong, levers pivoted intermediate their ends to each prong, a wheel pivotally secured to the ends of said levers below the said arms, springs disposed between said arms and the ends of said levers which carry said wheel, stops between the levers and arms to limit the compression of the spring, and stops between the other ends of the levers and the forks to limit its extension.

5. A trailer for road vehicles comprising a frame arranged to be hingedly connected to a vehicle, a caster wheel arranged to support said frame, a vertical pivot for said caster wheel, a casing in which said pivot is rotatably mounted, said frame having a socket adapted to receive said casing, said casing and frame having flanges, a divided ring arranged to clamp said flanges, and means for securing the parts of the ring.

6. A trailer for use with a motor car or other road vehicle comprising a frame provided at its front corners with eyes and hingedly connected to the rear of the car or vehicle by means of a horizontally disposed rod fitting said eyes and supported from the car or vehicle at right angles to the central axis of the car or vehicle, a caster wheel supporting the trailer having its pivot rotatably mounted in a casing, a socket in the frame of the trailer for receiving said casing, and means for detachably securing said casing in said socket, said means consisting of a divided ring engaging with flanges on said casing and socket, and a bolt and nut for contracting said divided ring, substantially as described.

7. A trailer for use with a motor car or other road vehicle comprising a frame provided at its front corners with eyes and hingedly connected or adapted to be hingedly connected to the rear of the car or vehicle by means of a horizontally disposed rod fitting said eyes and supported from the car or vehicle at right angles to the central axis of the car or vehicle, a caster wheel supporting the trailer having its pivot rotatably mounted in a casing, a socket in the frame of the trailer for receiving said casing, and means for locking said pivot pin against rotation consisting of a locking pin passing through said socket and casing and engaging with a recess in said pivot, substantially as described.

In testimony whereof I have signed my name to this specification in the presence of two subscribing witnesses.

HUGH HAMILTON GREGORY.

Witnesses:
   ARTHUR F. ENNIS,
   O. J. WORTH.